United States Patent [19]

Romero, Sr. et al.

[11] Patent Number: 4,865,344

[45] Date of Patent: Sep. 12, 1989

[54] WHEELCHAIR HAND PROPULSION APPARATUS

[75] Inventors: Bernardino S. Romero, Sr., Miami; Bruce D. Bayes, Treasure Island, both of Fla.

[73] Assignee: E. Lakin Phillips, Herndon, Va. ; a part interest

[21] Appl. No.: 218,567

[22] Filed: Jul. 13, 1988

[51] Int. Cl.[4] .................... B62M 1/04

[52] U.S. Cl. .................... 280/242; 280/304.1; 280/358; 74/142

[58] Field of Search ........... 280/242 R, 242 WC, 244, 280/236, 246, 25.2, 253, 255, 256, 289 WC, 257, 258; 74/142; 192/64, 47

[56] References Cited

U.S. PATENT DOCUMENTS

| | | | |
|---|---|---|---|
| 302,090 | 7/1884 | Bernhard | 280/244 |
| 838,228 | 12/1906 | Williams | 280/7.15 |
| 846,130 | 3/1907 | Muller | 280/246 |
| 1,058,173 | 4/1913 | Whitaker | 280/244 |
| 2,643,898 | 6/1953 | Everest et al. | 280/242 UC |
| 4,455,029 | 6/1984 | Taylor | 280/5.28 |
| 4,460,190 | 7/1984 | Spiess | 280/247 |
| 4,506,900 | 3/1985 | Korosue | 280/242 WC |
| 4,641,847 | 2/1987 | Busse | 280/242 WC |
| 4,652,026 | 3/1987 | Byrge | 280/242 WC |

*Primary Examiner*—Charles A. Marmor
*Assistant Examiner*—Richard Camby
*Attorney, Agent, or Firm*—Herbert W. Larson

[57] ABSTRACT

An apparatus or attachment to a wheelchair to allow a patient to move the chair in a forward, reverse, right or left direction. The apparatus comprises a push rod, spring mounted, actuating at a first end a pawl capable of engaging a ratchet axially mounted on a mounting plate attached to the side of the chair. A hand operated shift element activates a cam roller to move the push rod at a second end in a vertical direction. A bicycle type multi linked gear and chain connects the ratchet to the rear driving wheels of the chair. Movement of the push rod in its vertical position changes gears and a handle attached to the top of the push rod assembly permits movement of the chair by direct drive to the bicycle chain. A linkage connecting the push rod housing to the front mounted caster wheel allows the patient to move the caster wheels by turning the push rod handle connected to its housing.

7 Claims, 5 Drawing Sheets

WHEELCHAIR HAND PROPULSION APPARATUS

BACKGROUND OF THE INVENTION

1. Field of the Invention

This invention relates to a hand driven propulsion apparatus for use on a wheelchair. More particularly, it refers to a wheelchair hand propulsion apparatus having a movable handle connected by a push rod to a bicycle type drive chain.

2. Description of the Prior Art

Propulsion devices of many varying designs have been incorporated with wheelchairs such as shown in the following U.S. Pat. Nos. 2,643,898; 4,455,029; 4,460,190; 4,506,900; 4,641,847; and 4,652,026.

The most common propulsion device for a wheelchair currently in use is an electric drive mechanism connected to a battery or oversize side wheels driven by the patient exerting force on the wheels. The problem with the battery operated wheel chair is its cost and its weight which results in a limited use. The wheel propelled chair operated by hand requires significant shoulder power and wrist action to propel the chair forward. In many patients this exertion is too much and as a result, this type chair is impractical. A chair is needed that will allow a patient, at a low cost, to propel himself-/herself forward with a minimum amount of arm exertion.

SUMMARY OF THE INVENTION

We have invented a wheelchair propulsion apparatus easily mounted on a conventional wheelchair to provide an enhanced value chair. The chair is lightweight and low cost providing a mechanical advantage to a patient. The patient can propel the chair with a minimum of physical exertion.

A standard lightweight wheelchair, having two large back wheels and a front caster wheel can be easily converted to the chair apparatus of this invention. A mounting plate is attached in a vertical position between a seat frame and a lower frame member on the side, usually a right side, of a wheelchair. This frame is merely bolted to the chair. A ratchet is axially mounted on the mounting plate and a gear, corresponding to the ratchet, is mounted inboard of the ratchet and connected to it with a shaft. A second gear is mounted on a shaft connected to the side mounted driving wheels of the chair. A multi link chain connects the two gears. Movement of the ratchet will turn the side mounted wheels.

A spring mounted push rod actuates at its first end, a spring loaded pawl. The pawl moves the ratchet by manual movement forward and back of the push rod housing. The push rod has a shift element at its second end. The shift element puts pressure on the spring supporting the rod. When the spring of the push rod overcomes the force of the spring attached to the pawl, the ratchet will propel the chair in reverse by movement of the push rod housing. When the two springs are at the same force level the pawl will not engage the ratchet and the chair is in neutral. When the pawl spring overcomes the force from the push rod spring, the chair will operate in a forward direction. A linkage connected from the push rod housing to the front mounted caster wheel allows the patient to move the caster wheel by a turning of the push rod housing. In this manner, the patient can easily set the wheelchair for a forward or reverse direction merely by thumb actuation on the top of the push rod housing. By merely moving the push rod housing back and forth using a handle member attached to the push rod housing, the patient propels the chair.

DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
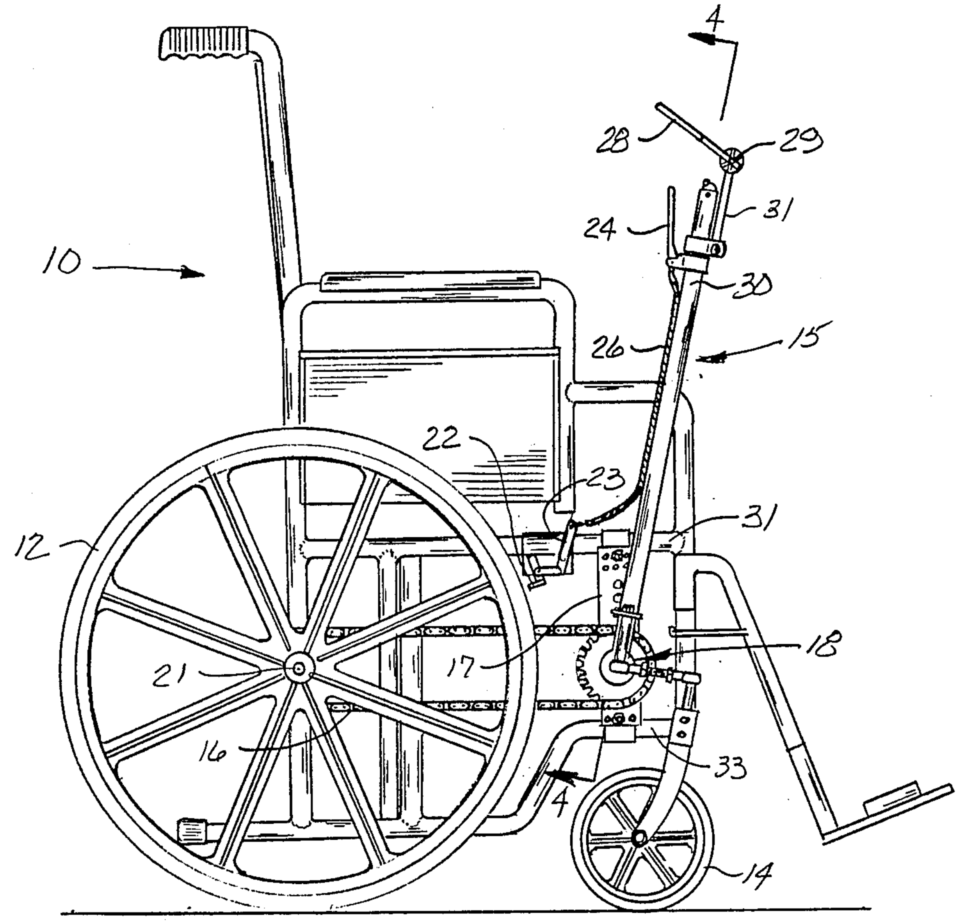
FIG. 1 is a right side view in elevation of the apparatus of this invention.
Figure 2:
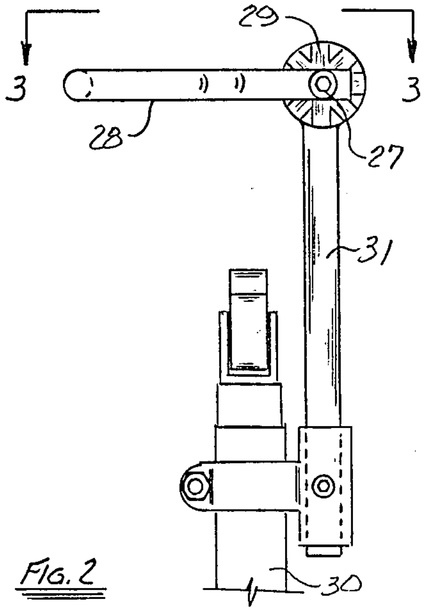
FIG. 2 is an expanded right side view of the handle and shift members.
Figure 3:
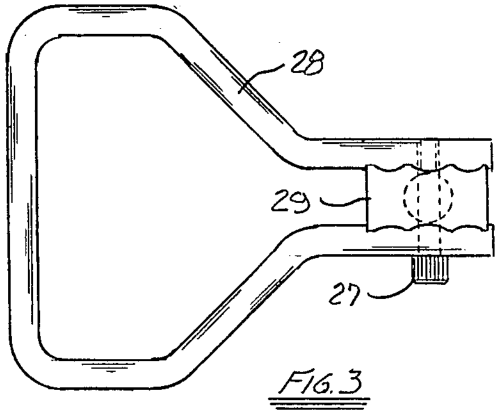
FIG. 3 is a top plan view of the handle member along lines 3—3 of FIG. 2.

Throughout the following detailed description, the same reference numerals refer to the same elements in all figures. The wheelchair 10 has a pair of driving wheels 12 and a front directional caster wheel 14 connected to a hand driven propulsion apparatus 15.

Figure 4:
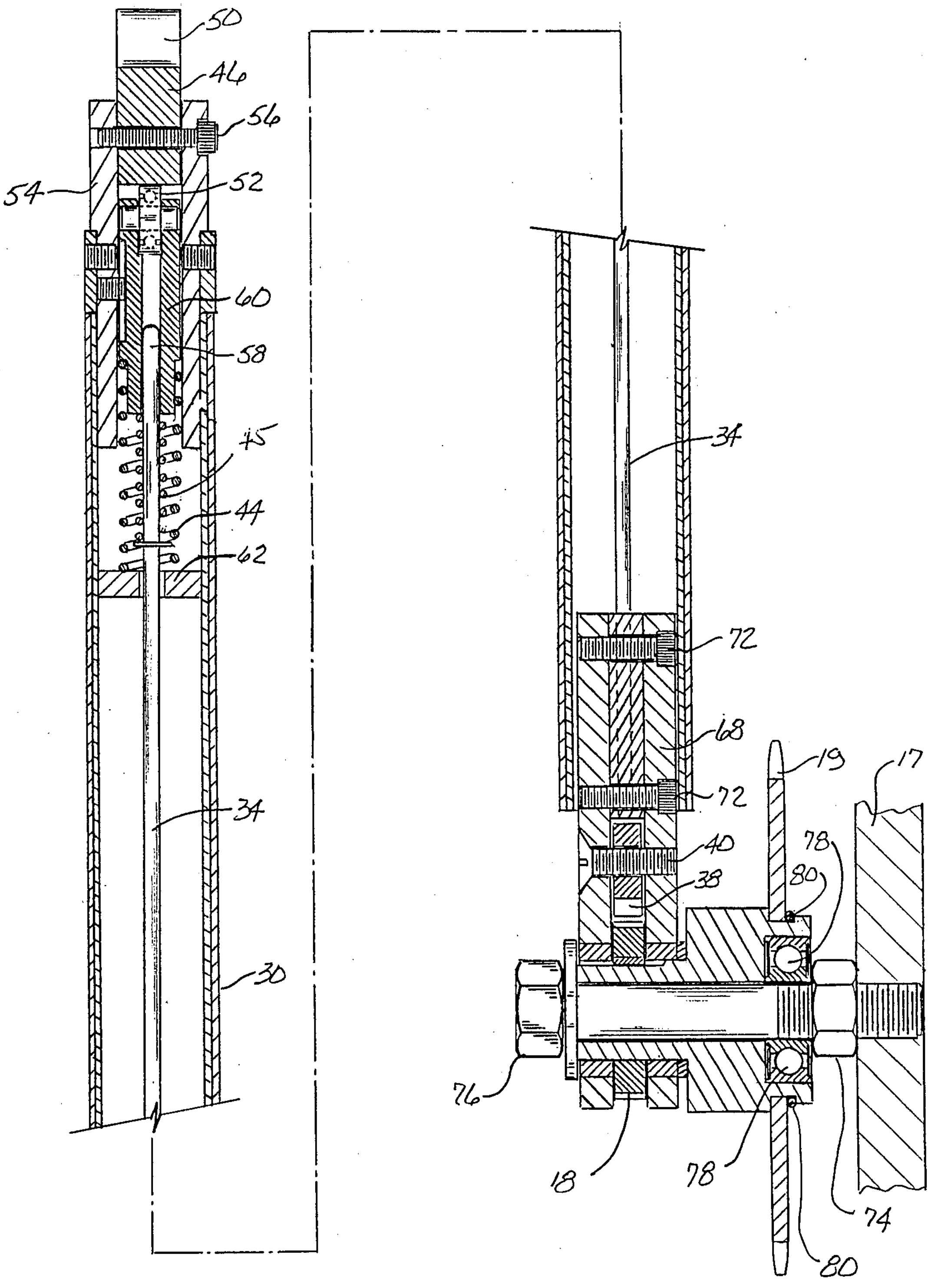
FIG. 4 is an expanded cross section along lines 4—4 of FIG. 1.

The propulsion apparatus 15 has a mounting plate 17 mounted at one end to a horizontal wheelchair seat frame member 35 and at a second end to a horizontal frame member 33 located below seat frame member 35. The mounting plate 17 can be bolted or otherwise, mounted to the chair frame at the discretion of the installer. The prime motivation is to make sure the mounting plate is securely fastened to the frame of the wheelchair. A ratchet 18 is axially mounted on the mounting frame as shown in FIG. 4. by bolt 76. The ratchet 18 acts to turn sprocket 19 axially mounted inboard of ratchet 18.

A linked chain 16 connects the sprocket 19 to a gear or sprocket 20 axially mounted on the shaft 21 supporting the wheels 12 of the wheelchair 10.

Linkage 23 connects the brake handle 24 and brake tube 26 to the brake pad 22.

The patient sitting in the wheelchair 10 grasps handle 28 which is adjusted by the lock mechanism 29 to a horizontal or vertical position, or in any position in between. A set screw 27 locks the handle 28 in the proper position. The handle is connected to a push rod housing 30 by a height adjusting bar 31. The push rod housing 30 encloses the push rod 34.

Figure 5:
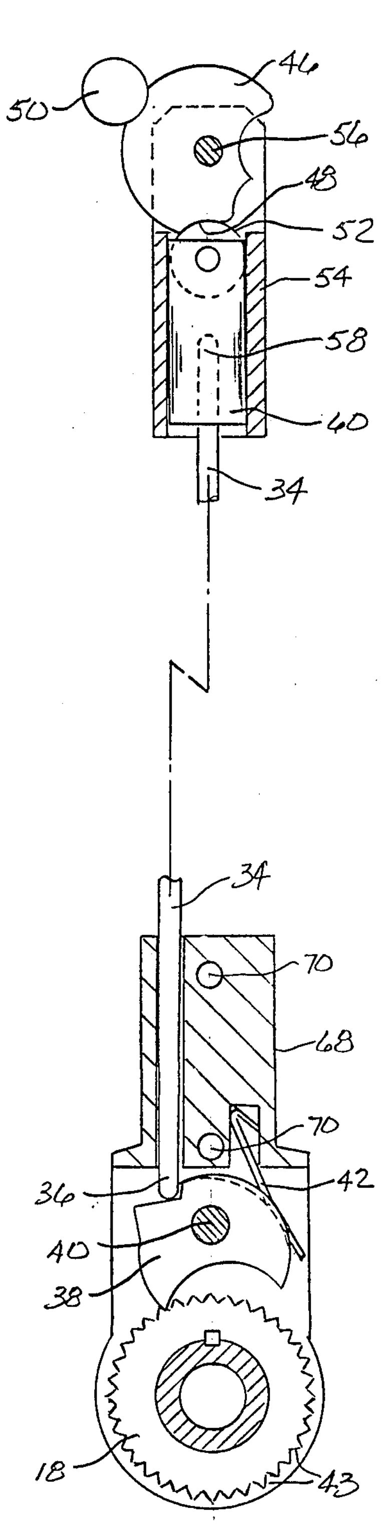
FIG. 5 is a cross section of the shift mechanism with the gears set for reverse propulsion.
Figure 6:
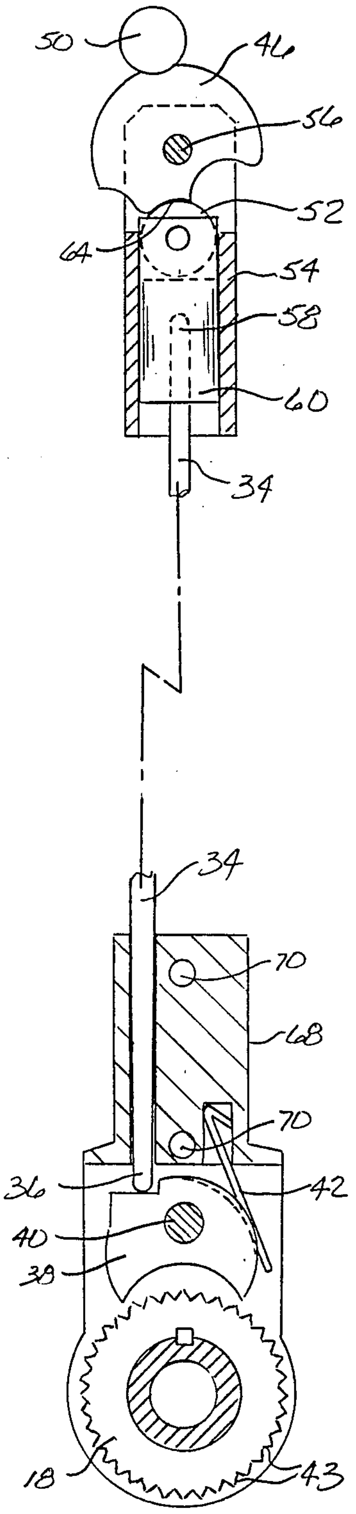
FIG. 6 is a cross section of the shifting mechanism with the gears set for the neutral position.
Figure 7:
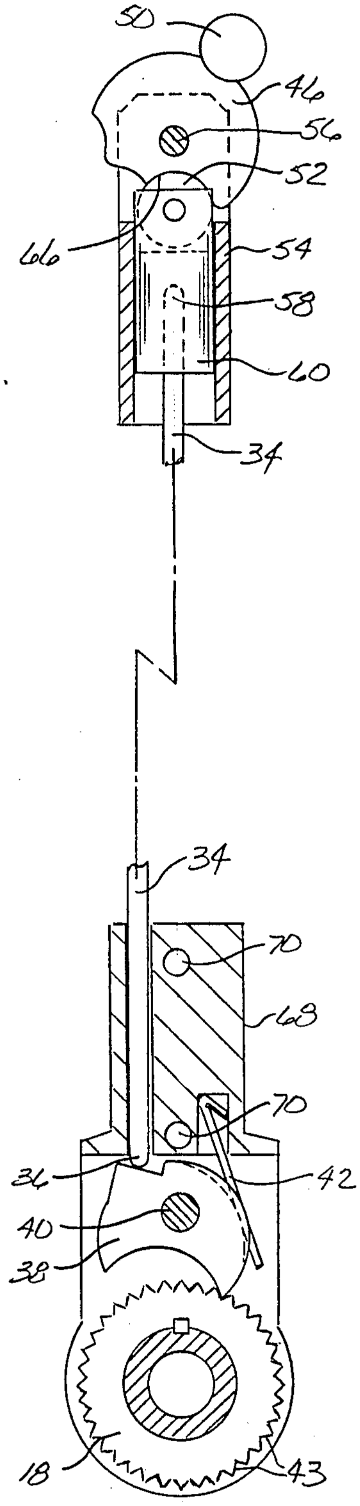
FIG. 7 is a cross section of the shifting mechanism with the gears set for forward propulsion.
Figure 8:
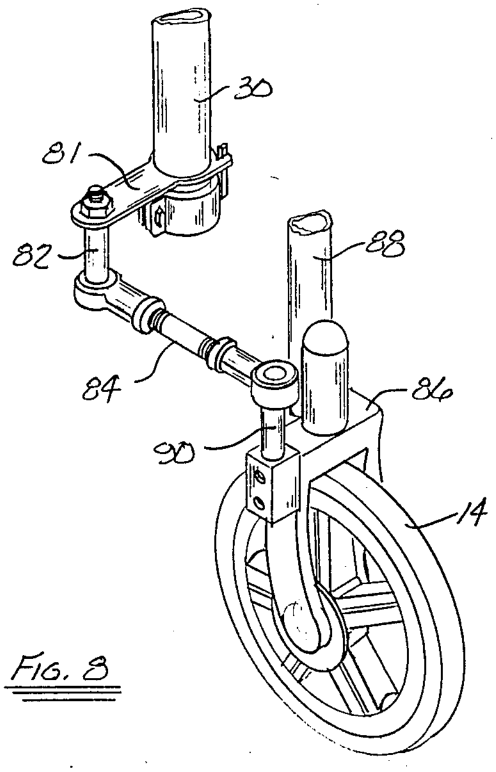
FIG. 8 is a perspective view of the front caster wheel of the wheelchair apparatus.
Figure 9:
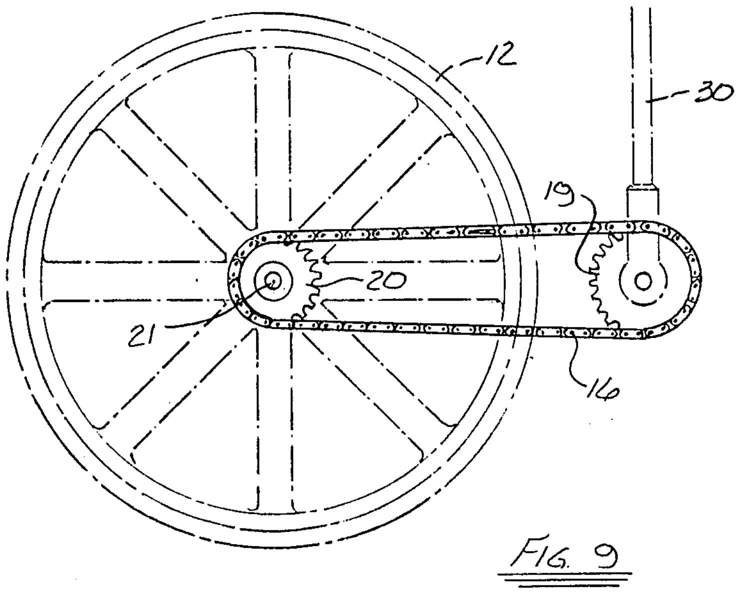
FIG. 9 is a detailed side view in elevation of the drive chain of the wheelchair apparatus.
Figure 10:
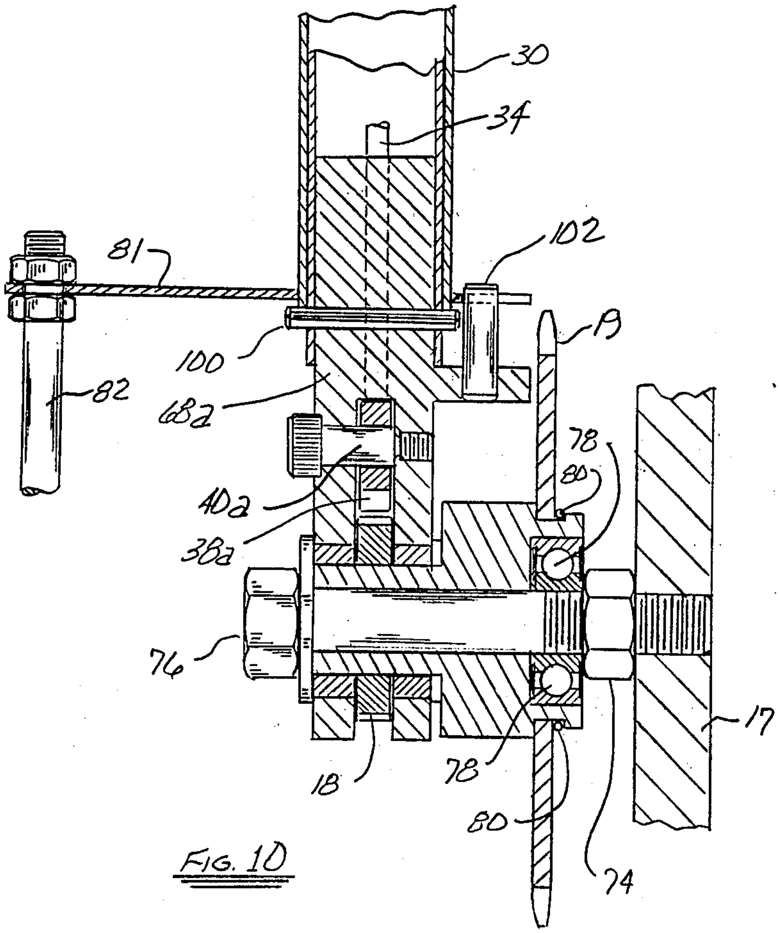
FIG. 10 is a sectional view of lower half or ratchet arm with a one piece yoke.

At a first end 36 the push rod 34 engages a pawl 38, see FIGS. 5–7. The pawl 38 is actually mounted on screw shaft 40 within the ratchet housing 68. The pawl 38 is spring loaded with spring 42. Spring 44 exerts tension on roller 52. Spring 45 at its upper end is permanently attached to spring housing 60 and at its lower end is permanently attached to the push rod 34. Pressure on the push rod 34 is achieved by positioning the cam roller 46 in its first position 48 by moving of the thumb rest 50. This causes sufficient pressure on spring 45 to overcome tension of spring 42 and causes the pawl 38 to engage the teeth 43 of ratchet 18.

The cam roller 46 moves on a roller 52 that is axially mounted in cam shaft housing 54. The cam roller 46 is also axially mounted within housing 54 using bolt 56. The second end 58 of the push rod 34 is nested within a spring housing 60 that fits within the cam shaft housing 54. A spring stop 62 controls movement of spring 44. The spring 44 is compressed by the spring housing 60 as the cam roller 46 pushes on the roller 52.

In the position shown in FIG. 5, the wheelchair is in the reverse mode. By moving the thumb rest 50 and thereby moving the cam roller to a second position 64, there is less pressure exerted on spring 45. The pressure of spring 42 cannnot be overcome so the pawl 38 remains in a neutral position as shown in FIG. 6. By moving the thumb rest 50 further and causing the cam roller 46 to move over to its extreme end into position 66 there is no force at all on spring 45 and the spring action of spring 42 allows the pawl to engage ratchet 18 as seen in FIG. 7 to place the chair in forward mode.

The lower end 36 of push rod 34 is located within a groove of ratchet housing 68. Ratchet housing 68 is bolted around the push rod 34 through openings 70. Therefore, bolts 72 in openings 70 hold the ratchet housing 68 in place within push rod housing 30. The sprocket 19 is separated from the mounting plate 17 by a nut 74 which is attached to a bolt 76. Ball bearings 78 facilitate the turning of sprocket 19. Sprocket 19 is held in place by retaining rings 80.

Figure 11:
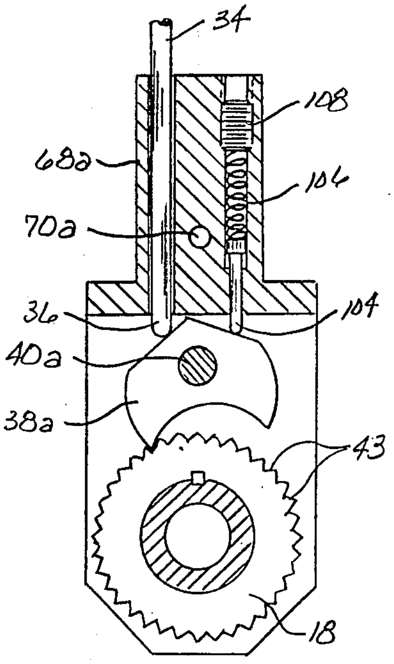
FIG. 11 is a cross section of a one piece yoke-ratchet in reverse position.
Figure 12:
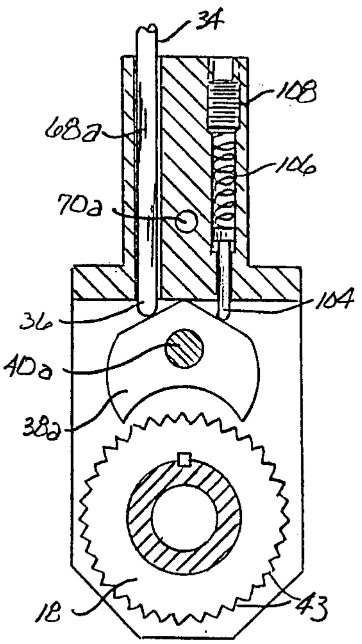
FIG. 12 is a cross section of a one piece yoke-ratchet in neutral position.
Figure 13:
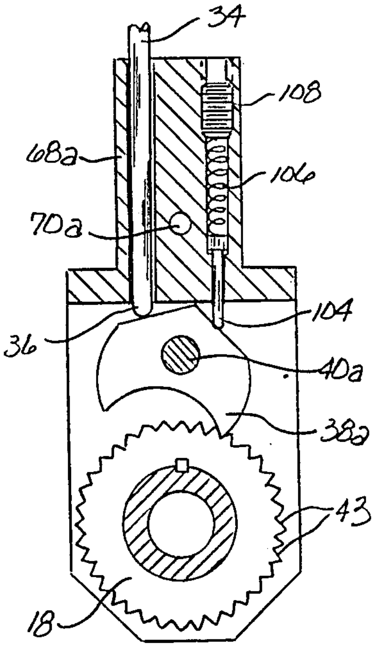
FIG. 13 is a cross section of a one piece yoke-ratchet in forward position.

In an alternative preferred embodiment shown in FIGS. 11 to 13, the pawl 38a has a flat top and is mounted on shaft portion 40a of a shoulder screw. The ratchet housing 68a is a one piece yoke. Holes 70a accommodate a locking pin 100 to fasten housing 30 to yoke 68a. Stop pin 102 controls rotation of arm 81. In place of spring 42 a pusher spring 106 is wedged between an adjusting screw 108 and the pusher 104 to control pressure on the pawl 38a and offset pressure exerted by the push rod 34 in the reverse position.

Arm 81 is engaged to push rod housing 30 and is connected to shaft 82. Shaft 82 connects to adjustable linkage 84 connected to caster wheel yoke 86. The wheel 14 is guided by yoke 86 which is also connected directly to the chair frame 88. The alignment unit 90 can be adjusted to align the caster wheel 14. Turning of the push rod housing 30 turns the linkage 84 and causes movement of the caster wheel 14.

This invention allows an invalid who has at least motor function in one arm to propel his/her chair in any direction forward or back and to direct his/her movement to the right or left or straight ahead.

Equivalent elements can be substituted for the elements of this invention without departing from the scope of the invention set forth herein.

Having thus described the invention, what is claimed and desired to be secured by Letters Patent is:

1. A wheelchair propulsion apparatus in combination with a wheelchair having a pair of axially connected side mounted driving wheels on a chair frame and a front mounted directional caster wheel, the propulsion apparatus comprising;

a. a mounting plate attached to the chair frame, b. a ratchet within a ratchet housing axially mounted on the mounting plate, c. a first gear parallel to the ratchet axially mounted on a shaft connected to the ratchet and mounting plate, d. a second gear corresponding to the first gear axially mounted on a shaft connected to the side mounted driving wheels, e. a multi linked chain connecting the first and second gears so that movement of the ratchet will turn the side mounted wheels, f. a first end of a spring mounted push rod mounted in the ratchet housing, the push rod actuating at the first end a pawl, the pawl axially mounted adjacent the ratchet and capable of engaging the ratchet to produce a forward or reverse movement of the side mounted wheels, g. a shift element activating a cam roller to move the push rod at a second end in a substantially vertical direction and h. a linkage between a housing surrounding the push rod and the caster wheel so that movement of the push rod housing turns the caster wheel.

2. The apparatus according to claim 1 wherein the first gear is mounted inboard of the ratchet.

3. The apparatus according to claim 1 wherein the means for changing the direction of the caster is an arm engaged to a push rod housing at one end and to a shaft connected to an adjustable linkage at a second end, the linkage attached to a yoke controlling movement of the caster wheel.

4. The apparatus according to claim 1 wherein the pawl is under tension of a leaf spring.

5. The apparatus according to claim 1 wherein the pawl is under tension of a spring loaded pawl push rod.

6. The apparatus according to claim 1 wherein the shift element contains a cam roller having three grooves corresponding to three different shift positions, a roller under spring tension, axially mounted in a cam shaft housing engaging each groove upon presentment by movement of the cam roller.

7. A wheelchair propulsion apparatus in combination with a wheelchair comprising a. a mounting plate attached to a frame of the chair, b. a ratchet mounted within a ratchet housing and first gear axially mounted on a shaft connected to the mounting plate, c. a second gear connected to a driving wheel of the chair, d. a bicycle type chain connecting the first and second gears, e. a pawl mounted within the ratchet housing activating the ratchet in response to the movement of a substantially vertically mounted push rod having a lower end mounted within the ratchet housing, f. a shift element for controlling the forward or reverse movement of the chair by action on the push rod and g. a housing around the push rod connected to a means for changing the direction of movement of a wheelchair wheel.

* * * * *